US012708580B2

(12) United States Patent
Schuerch, Jr.

(10) Patent No.: US 12,708,580 B2
(45) Date of Patent: Aug. 18, 2026

(54) CLAMP FOR SURGICAL TABLES

(71) Applicant: Peter E. Schuerch, Jr., Quincy, MA (US)

(72) Inventor: Peter E. Schuerch, Jr., Quincy, MA (US)

( * ) Notice: Subject to any disclaimer, the term of this patent is extended or adjusted under 35 U.S.C. 154(b) by 14 days.

(21) Appl. No.: 18/425,350

(22) Filed: Jan. 29, 2024

(65) Prior Publication Data

US 2024/0252377 A1 Aug. 1, 2024

Related U.S. Application Data

(60) Provisional application No. 63/441,615, filed on Jan. 27, 2023.

(51) Int. Cl.
*A61G 13/10* (2006.01)

(52) U.S. Cl.
CPC .................................. *A61G 13/101* (2013.01)

(58) Field of Classification Search
CPC .. A61G 13/00; A61G 13/101; A61G 13/1285; A61G 13/01
See application file for complete search history.

(56) References Cited

U.S. PATENT DOCUMENTS

| | | | | |
|---|---|---|---|---|
| 4,547,092 | A | 10/1985 | Vetter et al. | |
| 5,538,215 | A | 7/1996 | Hosey | |
| 6,315,260 | B1 | 11/2001 | Lees | |
| 6,499,158 | B1 * | 12/2002 | Easterling | A61G 15/10 5/601 |
| 6,598,275 | B1 * | 7/2003 | Kolody | F16B 2/10 5/601 |
| 6,622,980 | B2 | 9/2003 | Boucher et al. | |
| 7,857,271 | B2 | 12/2010 | Lees | |
| 8,302,921 | B2 | 11/2012 | Schuerch | |
| 2006/0255220 | A1 * | 11/2006 | Skripps | A61G 13/04 248/228.4 |
| 2009/0013507 | A1 * | 1/2009 | Scott | F16B 2/10 24/502 |
| 2014/0007408 | A1 * | 1/2014 | Nool | B65D 25/22 29/525.01 |
| 2016/0281920 | A1 * | 9/2016 | Perez | F16M 13/022 |
| 2023/0181395 | A1 * | 6/2023 | Fernando | A61G 7/0503 414/397 |

* cited by examiner

*Primary Examiner* — Fredrick C Conley
(74) *Attorney, Agent, or Firm* — Pandiscio & Pandiscio

(57) ABSTRACT

Apparatus for mounting a medical appliance to a rail of a surgical operating table, the apparatus comprising: a clamp body having an appliance mounting portion and a rail mounting portion; wherein the rail mounting portion comprises an upper jaw and a lower jaw and a passageway disposed between the upper jaw and the lower jaw for receiving the rail of the surgical table, wherein the lower jaw is configured to be moved towards or away from the upper jaw.

19 Claims, 23 Drawing Sheets

CLAMP FOR SURGICAL TABLES

REFERENCE TO PENDING PRIOR PATENT APPLICATION

This patent application claims benefit of prior U.S. Provisional Patent Application Ser. No. 63/441,615, filed Jan. 27, 2023 by Peter E. Schuerch for CLAMP FOR SURGICAL TABLES.

The above-identified patent application is hereby incorporated herein by reference.

FIELD OF THE INVENTION

This invention relates to clamps for securing medical apparatus to an object in general, and more particularly to a novel clamp for securing medical apparatus to a surgical table.

BACKGROUND OF THE INVENTION

Tables used for medical procedures (e.g., patient support tables used for surgery) are commonly equipped with a rail disposed about one or more of their edges which is configured to receive a post holding clamp, such that the clamp may be mounted to the rail and a medial appliance (e.g., a medical device) comprising a post may in turn, be mounted to the post holding clamp, whereby to mount the medical device to the table. The rails disposed about the edge(s) of the table are preferably spaced apart from the table edge by a standard distance and are typically of varying dimensions.

Prior art clamps typically used to mount medical devices to such rails generally comprise a channel oriented parallel to the longitudinal axis of the rail, which channel is formed slightly larger than the dimensions of the rail in order to allow the clamp to be slid along the rail and positioned at a desired location. Gaps may be provided in the rail in order to allow the clamp to be mounted to (or removed from) the rail as desired.

However, such rails may comprise different heights (e.g., the dimension of the rail running perpendicular to the longitudinal dimension of the rail). That is, some rails may be "taller" than other, "shorter" rails, necessitating the use of clamps comprising channels of different dimensions in order to accommodate rails having different heights.

Thus there is a need for a new and improved clamp configured to mount to rails with different height dimensions, whereby to facilitate mounting an appliance (e.g., a medical device comprising a post) to rails of varying heights.

SUMMARY OF THE INVENTION

The present invention comprises the provision and use of a new and improved clamp configured to mount to rails with different height dimensions, whereby to facilitate mounting an appliance (e.g., a medical device comprising a post) to rails of varying heights.

In a preferred form of the invention, there is provided apparatus for mounting a medical appliance to a rail of a surgical operating table, the apparatus comprising:

- a clamp body having an appliance mounting portion and a rail mounting portion;
- wherein the rail mounting portion comprises an upper jaw and a lower jaw and a passageway disposed between the upper jaw and the lower jaw for receiving the rail of the surgical table, wherein the lower jaw is configured to be moved towards or away from the upper jaw.

In another preferred form of the invention, there is provided a method for mounting a medical appliance to a rail of a surgical operating table, the method comprising:

- providing apparatus comprising:
  - a clamp body having an appliance mounting portion and a rail mounting portion;
  - wherein the rail mounting portion comprises an upper jaw and a lower jaw and a passageway disposed between the upper jaw and the lower jaw for receiving the rail of the surgical table, wherein the lower jaw is configured to be moved towards or away from the upper jaw;
- adjusting the size of the passageway by moving the lower jaw towards or away from the upper jaw; and
- positioning the rail mounting portion of the clamp body over the rail of the surgical table.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENT

Figure 1:
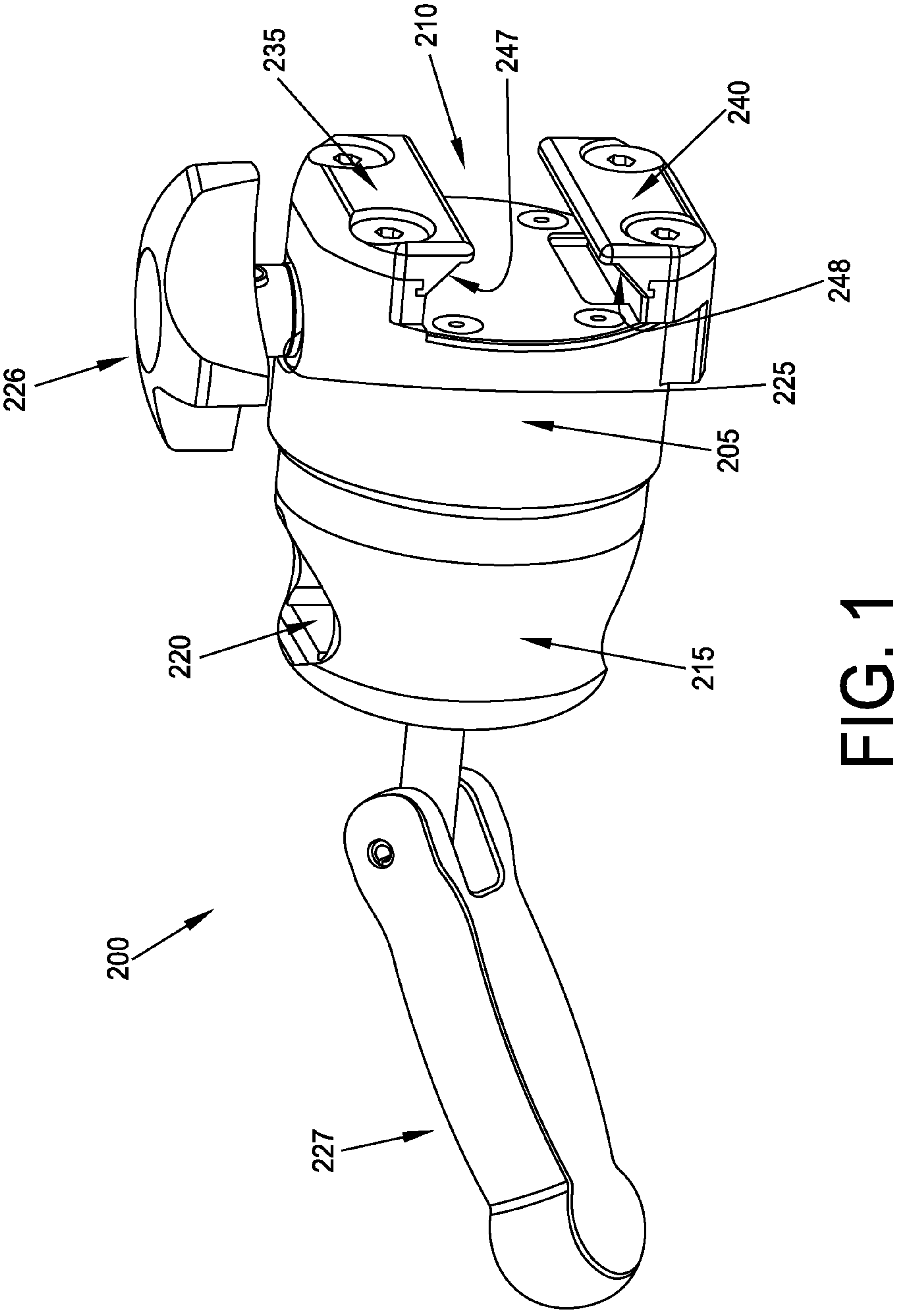
FIGS. 1-5 are schematic views showing a novel clamp formed in accordance with the present invention.
Figure 2:
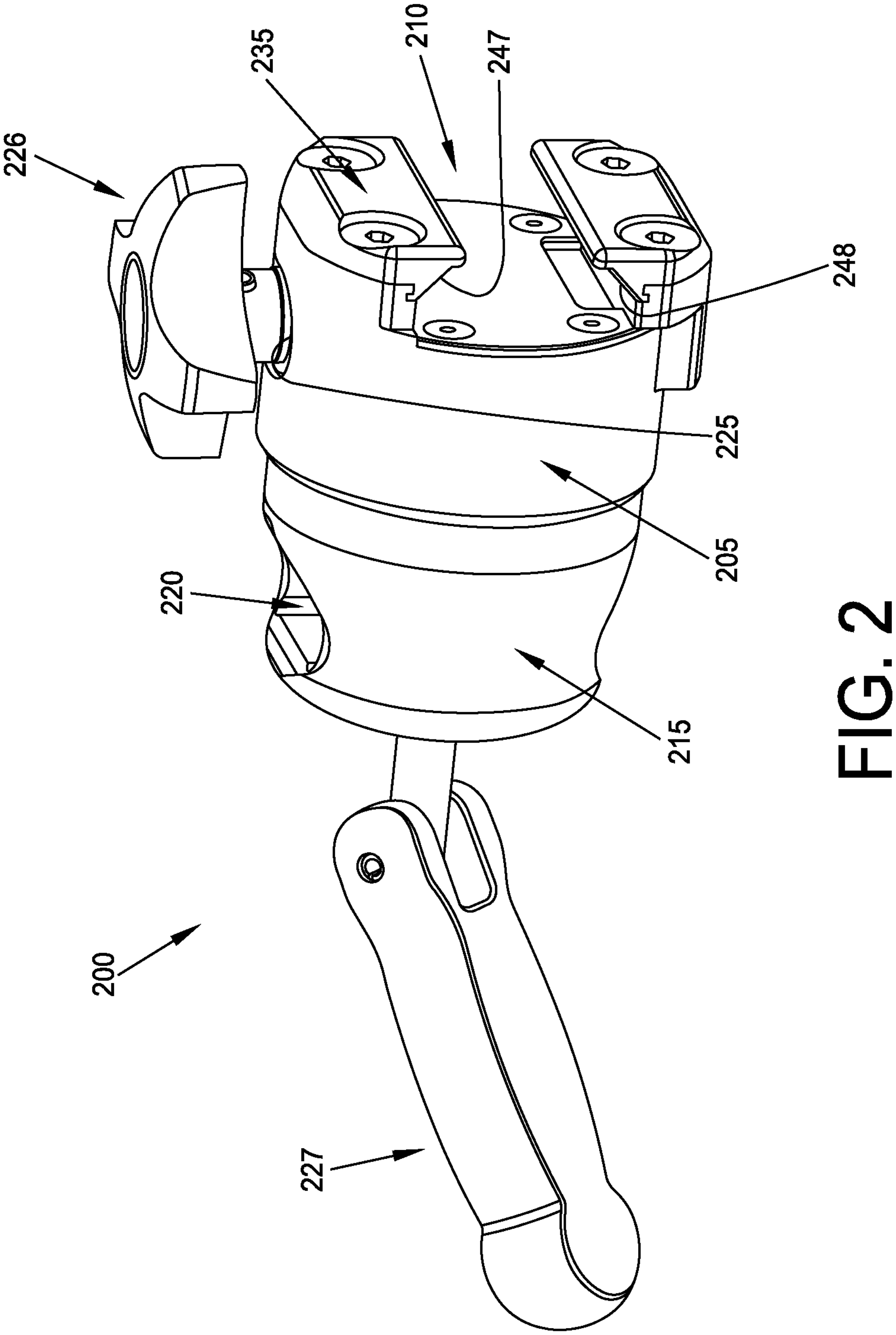
Figure 3:
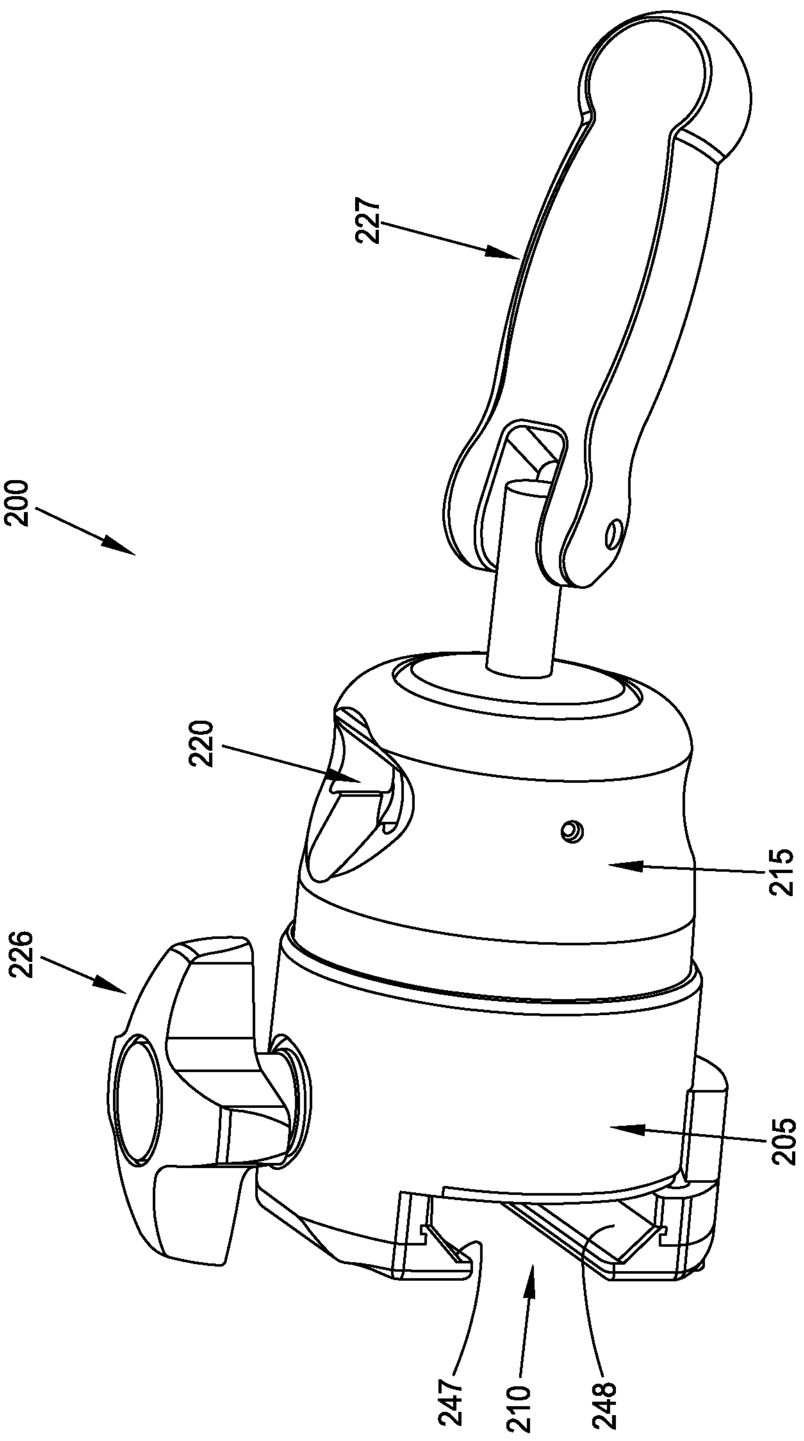
Figure 4:
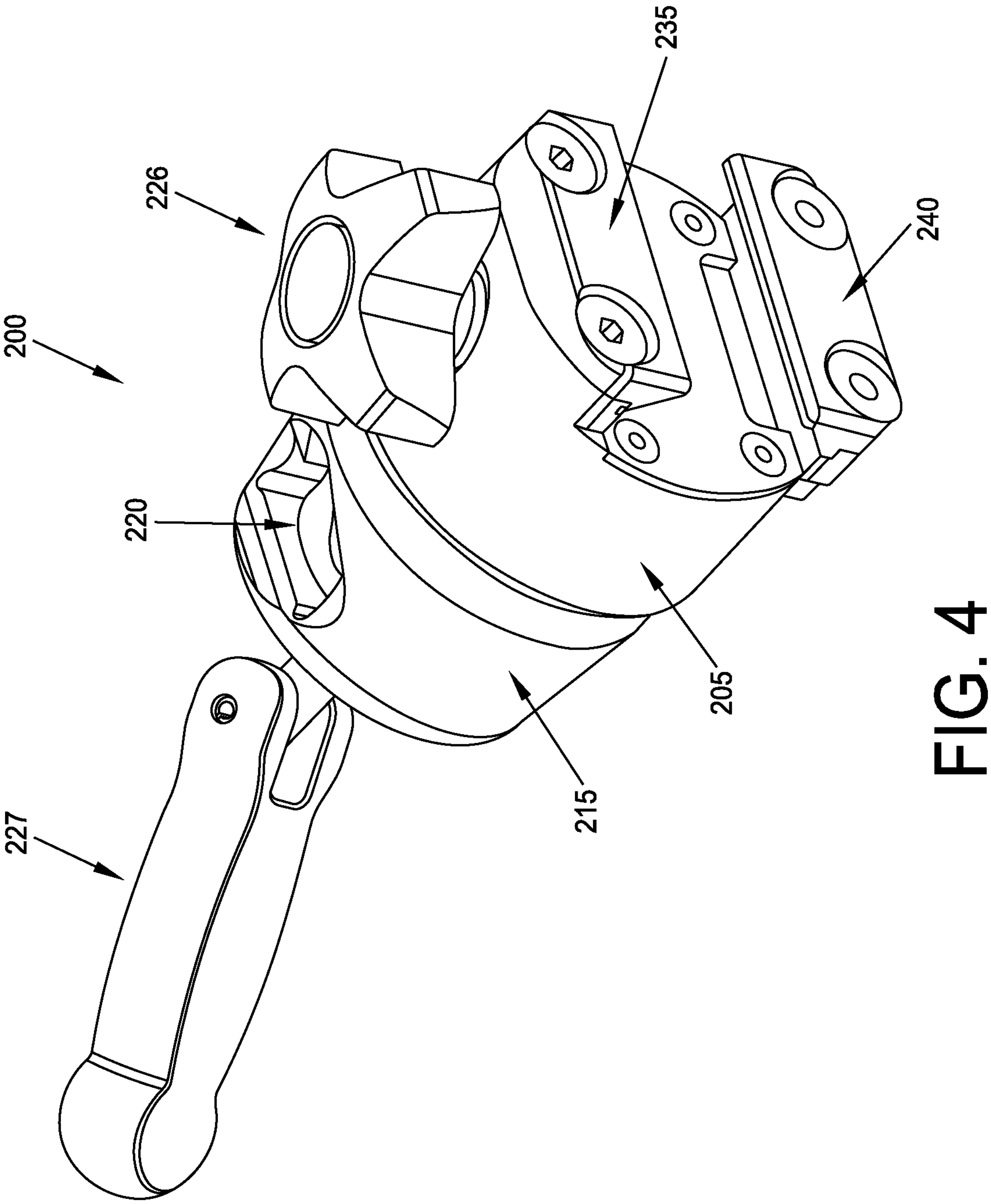
Figure 5:
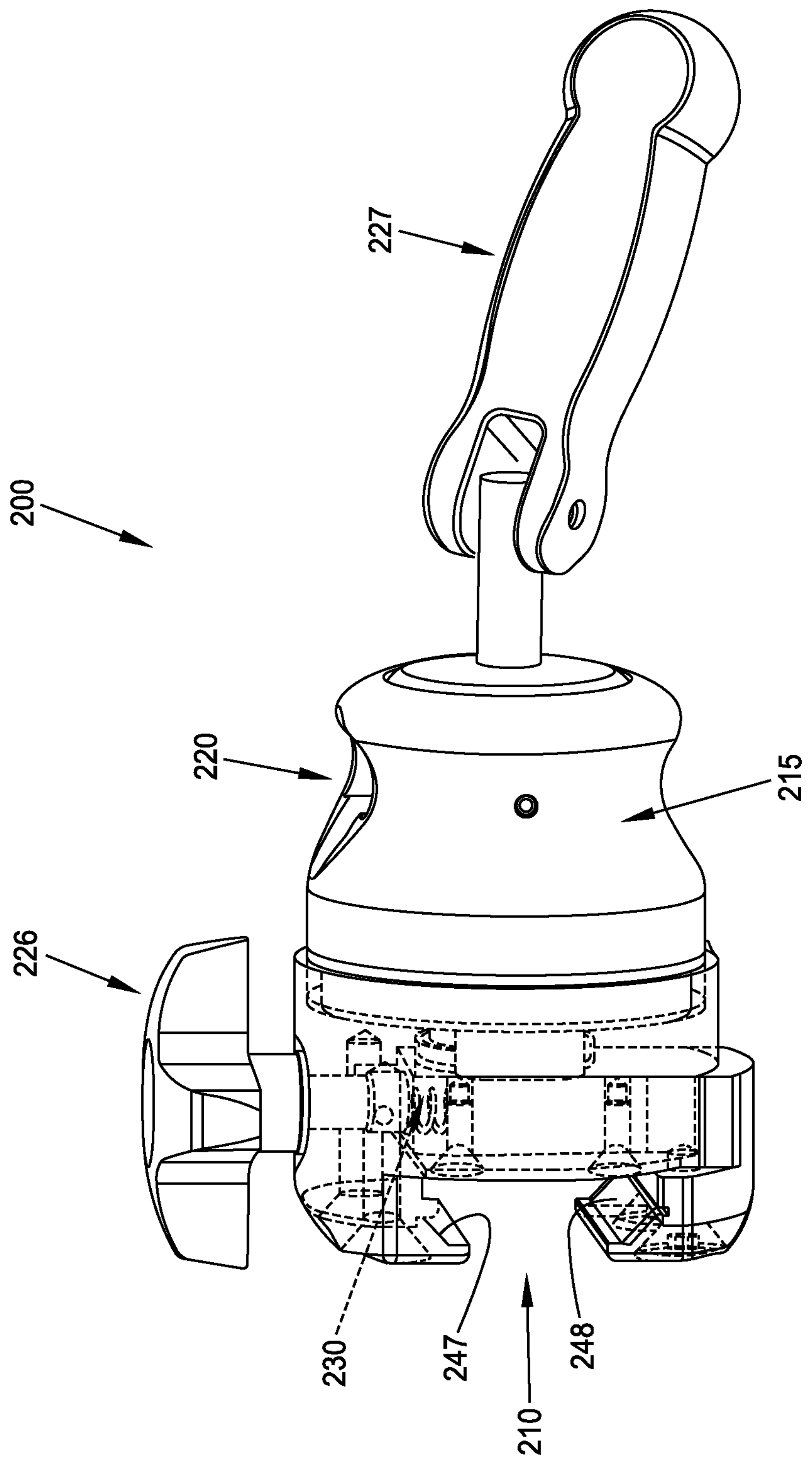
Figure 6:
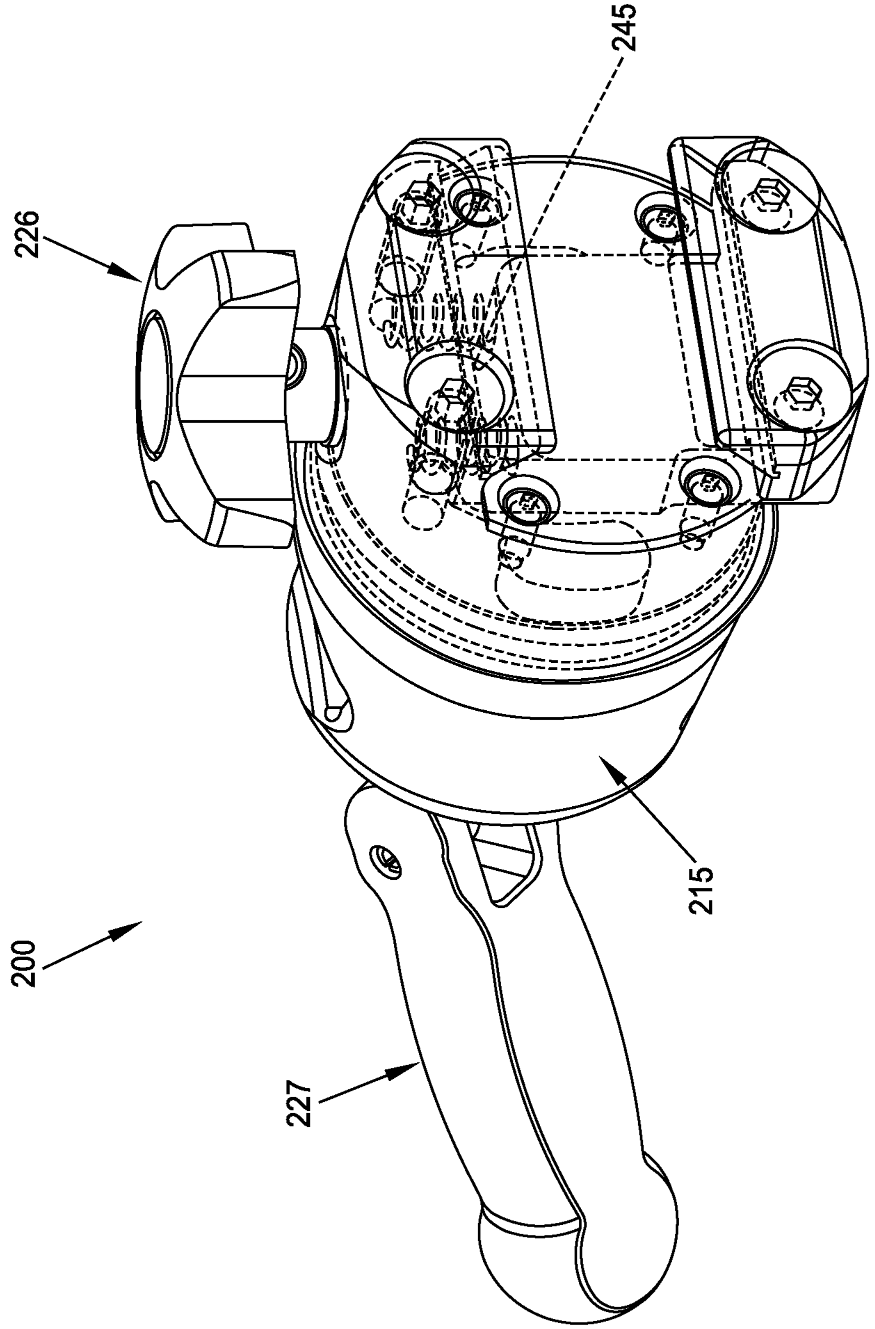
FIGS. 6-17 are schematic views showing further aspects of the novel clamp of FIGS. 1-5 formed in accordance with the present invention.

The present invention comprises the provision and use of a new and improved clamp configured to mount to rails with different height dimensions, whereby to facilitate mounting an appliance (e.g., a medical device comprising a post) to rails of varying heights. More particularly, and looking now at FIGS. 1-5, there is shown a novel clamp 200 configured to mount an appliance (e.g., a surgical instrument, a stirrup, etc.) to rails having differing rail heights, as will hereinafter be discussed in further detail.

Still looking at FIGS. 1-5, novel clamp 200 generally comprises a clamp body 205 having a passageway 210 passing horizontally therethrough which is sized to receive a rail (e.g., the side rail of a gurney, surgical table, etc.) therein, and a rotationally-adjustable appliance mounting portion 215 comprising a port 220 for receiving a post (not shown) of an appliance (e.g., a surgical instrument, a stirrup, etc.) which is to be mounted to clamp 200.

Clamp 200 also comprises an opening 225 formed in clamp body 205, a knob 226 and post 226A for modifying a dimension of passageway 210, and a handle 227 for releasably securing a post (e.g., the post of a surgical instrument, a stirrup, etc.) within port 220 of the rotationally-adjustable appliance mounting portion 215.

Passageway 210 of clamp body 205 is defined by an upper jaw 235 fixedly mounted to clamp body 205, and a lower jaw 240 adjustably mounted to clamp body 205 so as to be able to be selectively moved vertically (e.g., to slide) relative to upper jaw 235.

More particularly, and looking now at FIGS. 6-17, lower jaw 240 comprises a threaded opening 245 formed in an upper surface of lower jaw 240 and sized to threadingly engage the end of an adjustment screw 230 disposed within opening 225 of clamp body 205. As a result of this construction, knob 226 may be selectively rotated, whereby to rotate adjustment screw 230 which is, in turn, threadingly mated with threaded opening 245 of lower jaw 240. See FIGS. 8 and 9. When knob 226 is rotated in a first direction, adjustment screw 230 is rotated in the first direction, and lower jaw 240 moves vertically away from upper jaw 235 (whereby to increase the height of passageway 210); when adjustment screw 230 is rotated in a second, opposite, direction, lower jaw 240 moves vertically towards upper jaw 235 (whereby to reduce the height of passageway 210).

Thus, rotation of knob 226 permits a user to selectively adjust the vertical distance between upper jaw 235 and lower jaw 240, and hence to adjust the vertical (i.e., "height") dimension of passageway 210 so as to permit mounting of clamp 200 to rails having differing vertical dimensions (i.e., rails having different "heights"). In a preferred form of the invention, one or more springs 228 are disposed between an upper surface of lower jaw 240 and clamp body 205, whereby to bias lower jaw 240 downward and facilitate moving lower jaw 240 away from upper jaw 235 when knob 226/adjustment screw 230 are rotated in the first direction. See FIGS. 7 and 20.

In one preferred form of the invention, at least one of upper jaw 235 and lower jaw 240 comprises a surface which tapers (or is angled) towards passageway 210 (i.e., slant 247 of upper jaw 235 and slant 248 of lower jaw 240). See FIGS. 1-3, 5 and 8. Slants 247, 248 facilitate attachment/removal of clamp 200 from a rail, and also help to maintain secure mounting of clamp 200 to rails of varying "widths" (i.e., the dimension extending perpendicular to the longitudinal axis of the rail to which clamp 200 is mounted and also perpendicular to the aforementioned "height" dimension).

Figure 18:
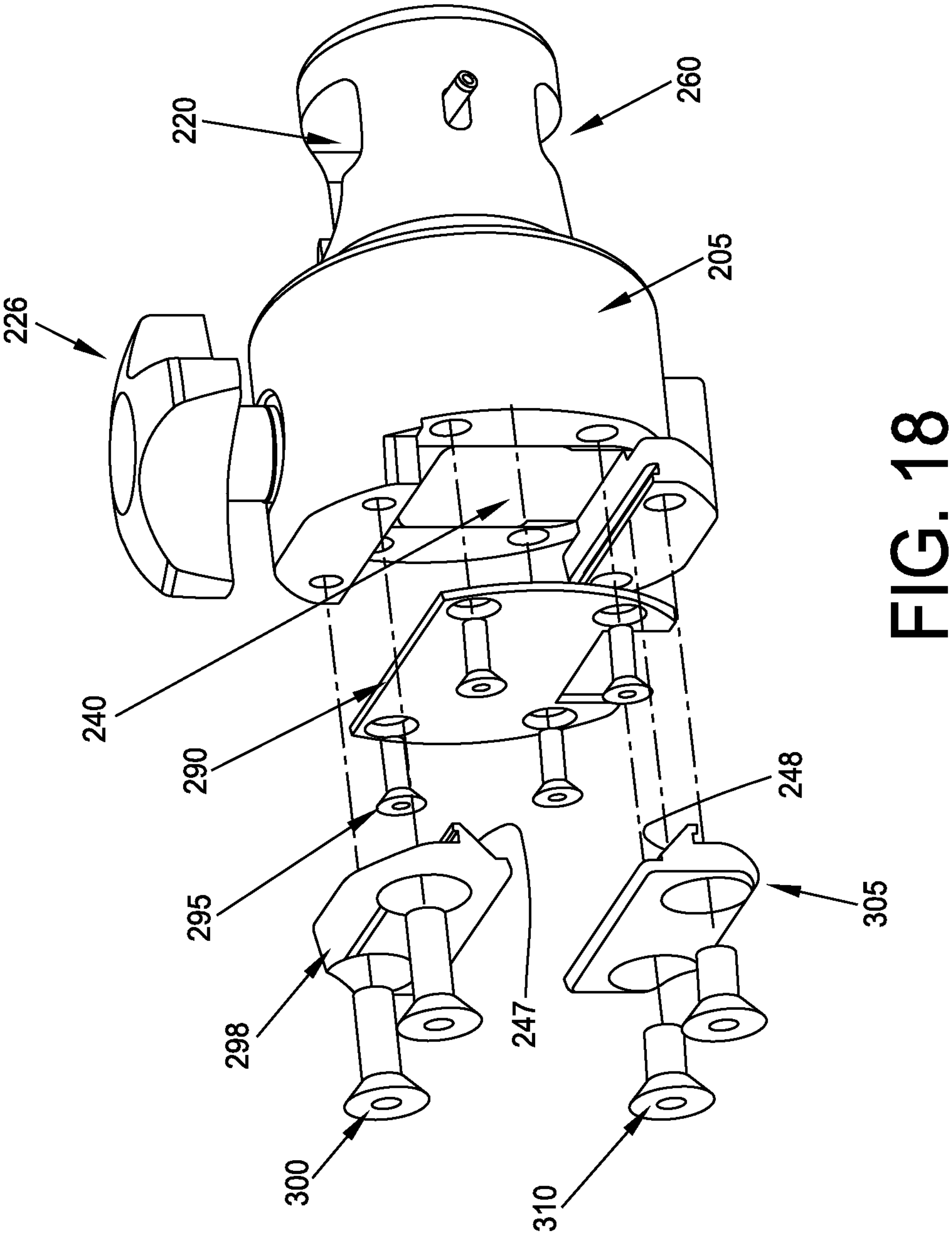
FIGS. 18 and 19 are schematic views showing further aspects of the novel clamp of FIGS. 1-5 formed in accordance with the present invention.
Figure 19:
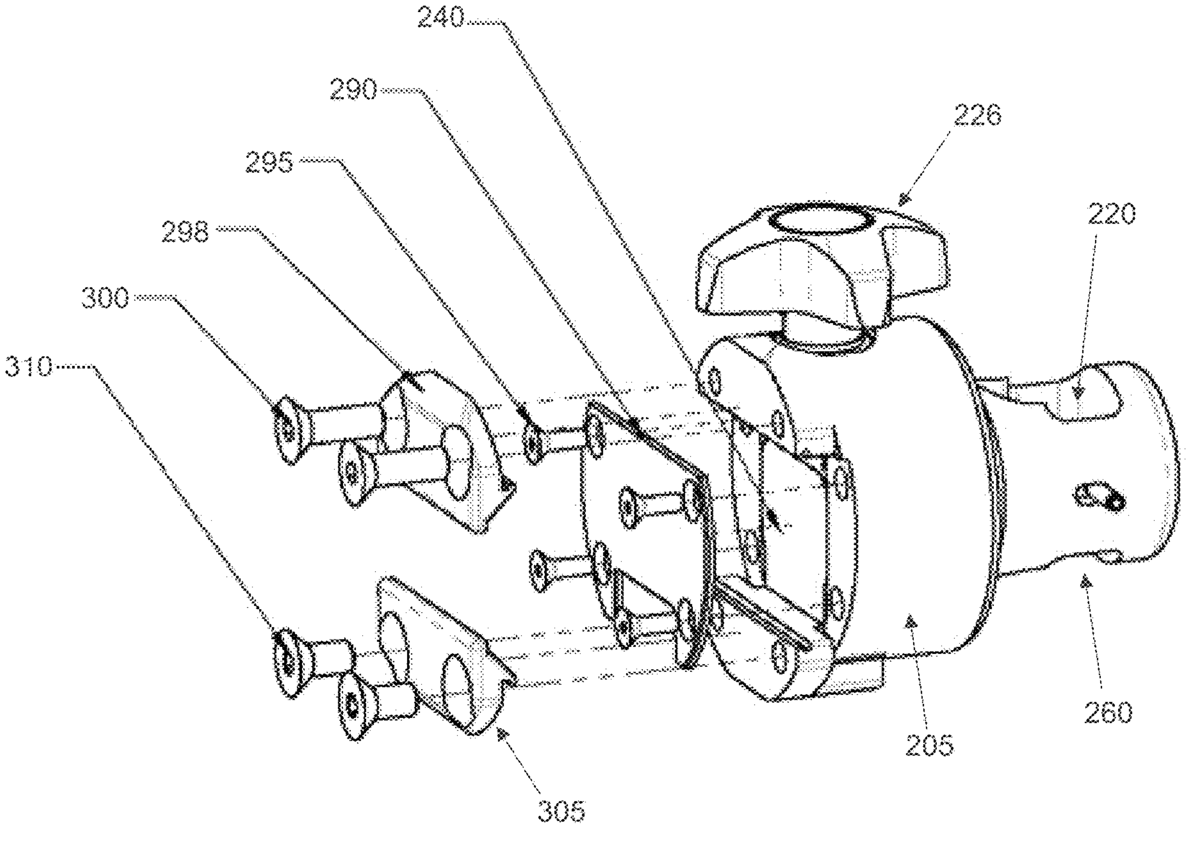

To this end, and looking now at FIGS. 18 and 19, if desired, clamp body 205 may comprise a plate 290 mounted to clamp body 205 (e.g., via one or more fasteners 295) so as to form a back surface of passageway 210. Upper jaw 235 may comprise an upper jaw element 298 mounted to upper jaw 235 via one or more fasteners 300. Lower jaw 240 may comprise a lower jaw element 305 mounted to lower jaw 240 via one or more fasteners 310. It will be appreciated that inasmuch as slants 247, 248 are formed on upper jaw element 298 and lower jaw element 305 (see FIG. 18), and inasmuch as upper jaw element 298 and lower jaw element 305 are mounted to upper jaw 235 and lower jaw 240, respectively, via a plurality of fasteners, it is possible to remove or replace upper jaw element 298 and lower jaw element 305 as desired (e.g., if it is not desirable to have slants 247, 248 on upper jaw 235 and/or lower jaw 240).

Looking now at FIGS. 20-23, there are shown further aspects of clamp body 205 and appliance mounting portion 215.

Figure 20:
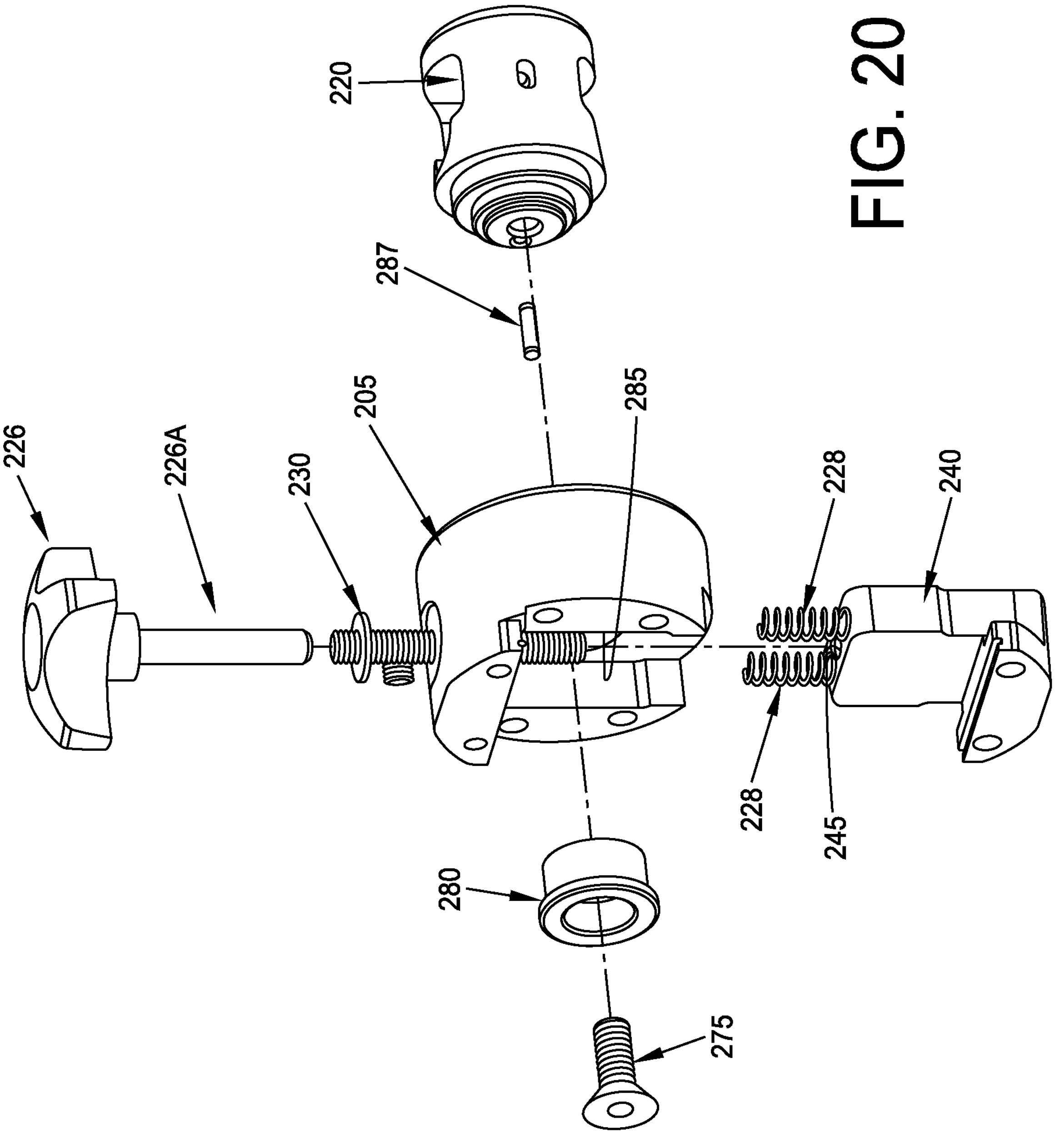
FIGS. 20 and 21 are schematic views showing still further aspects of the novel clamp of FIGS. 1-5 formed in accordance with the present invention.
Figure 21:
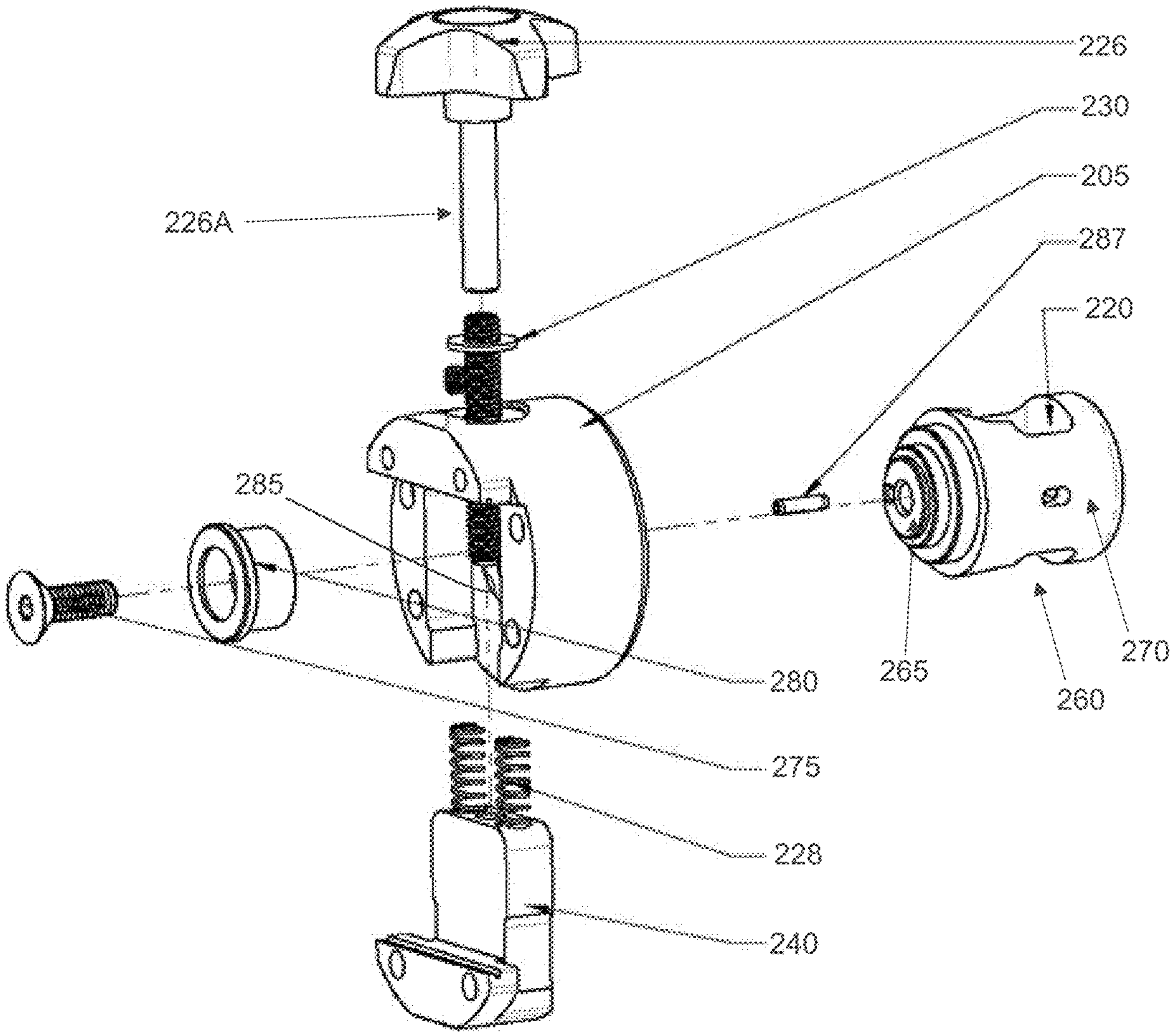

More particularly, and looking now at FIGS. 20 and 21, appliance mounting portion 215 preferably comprises a bearing element 260 comprising a stationary bearing 265 mounted to a coaxially-disposed rotatable bearing 270, with the aforementioned port 220 passing completely through rotatable bearing 270 so as to be rotatable relative to stationary bearing 265. Bearing element 260 is preferably mounted to clamp body 205 via a fastener 275 and a washer 280 passing through a central opening 285 formed in clamp body 205 perpendicular to the axis of opening 225. If desired, one or more pins 287 may be used to mount stationary bearing 265 to clamp body 205 in order to ensure that stationary bearing 265 does not rotate relative to clamp body 205.

Figure 7:
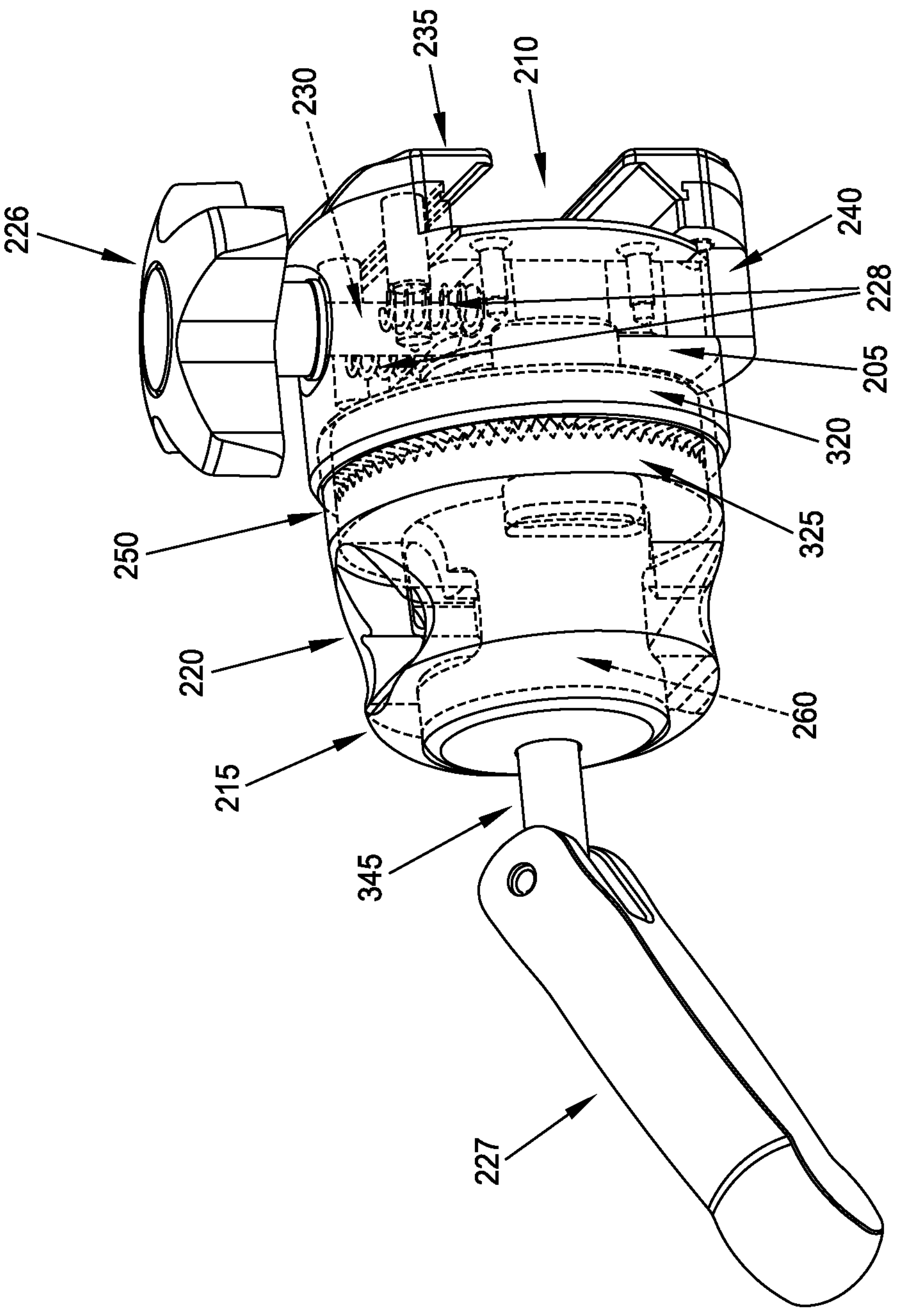
Figure 8:
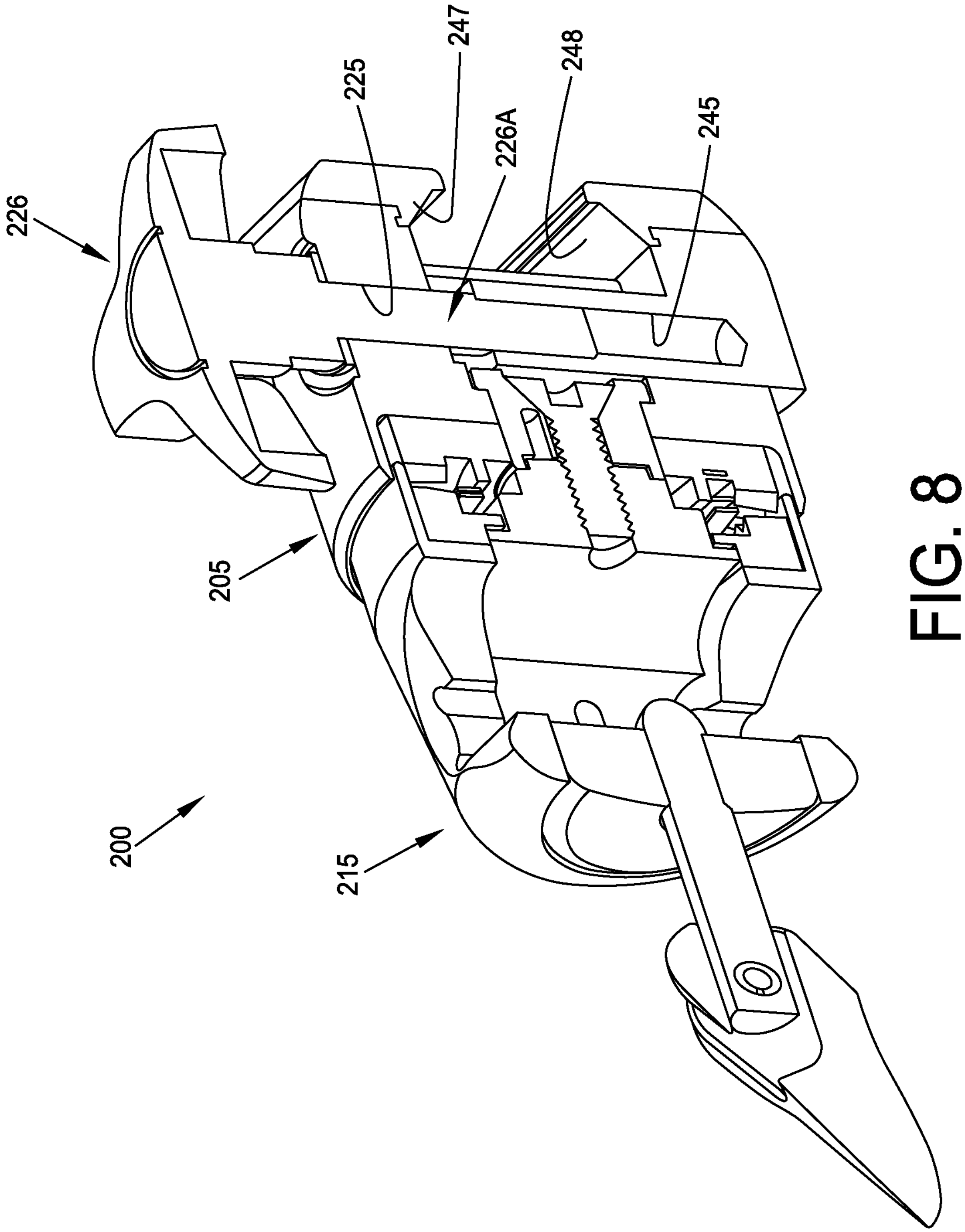
Figure 9:
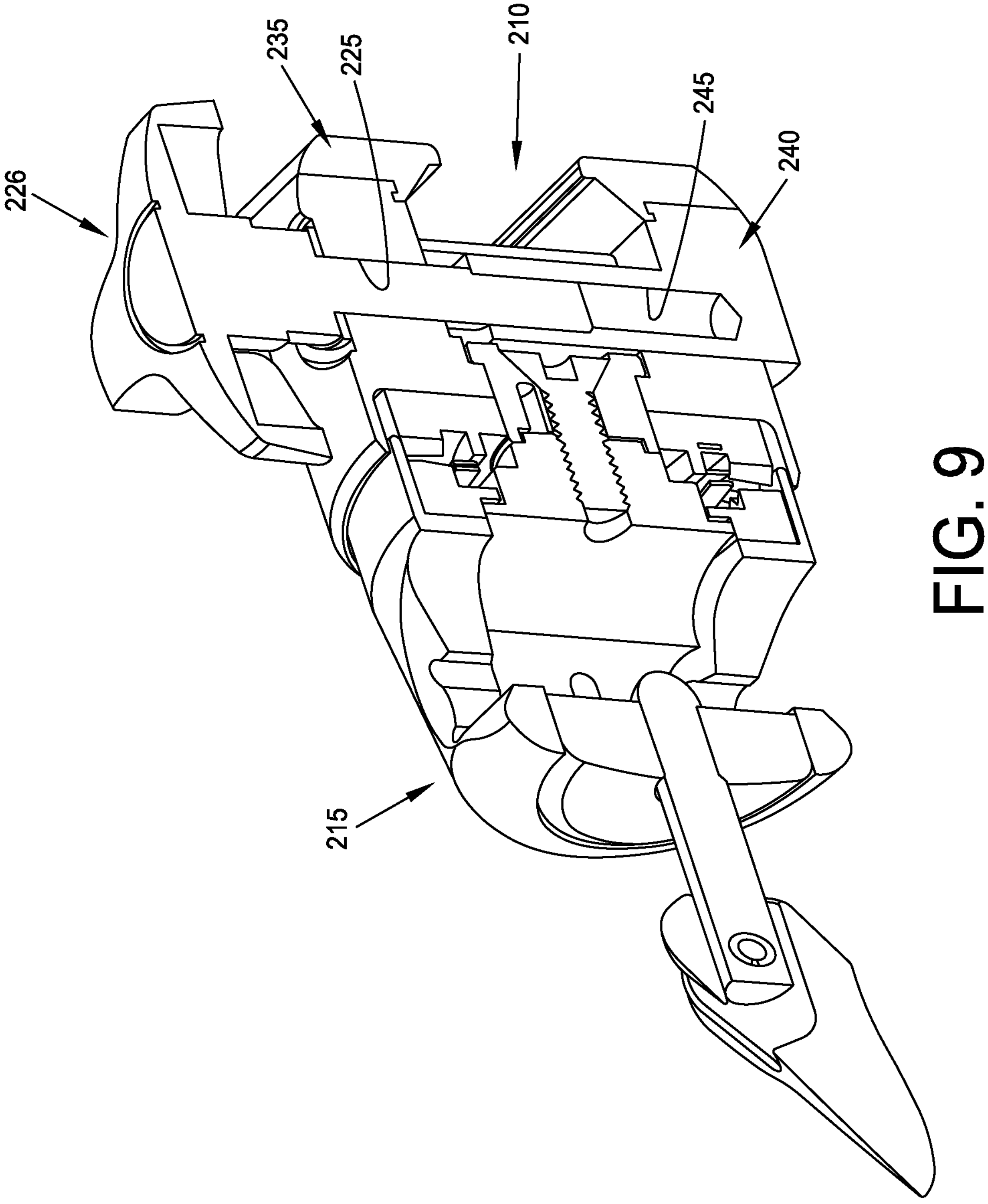
Figure 10:
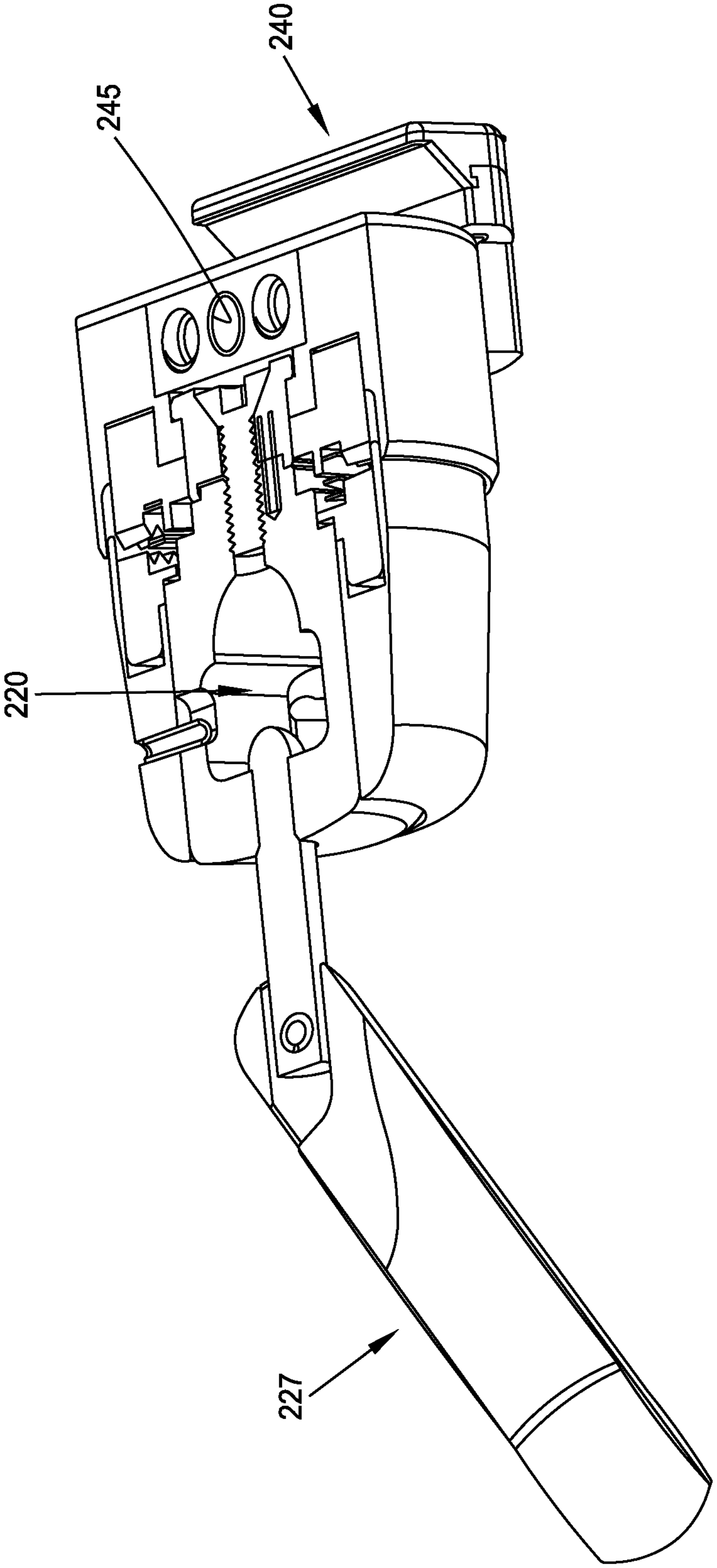
Figure 11:
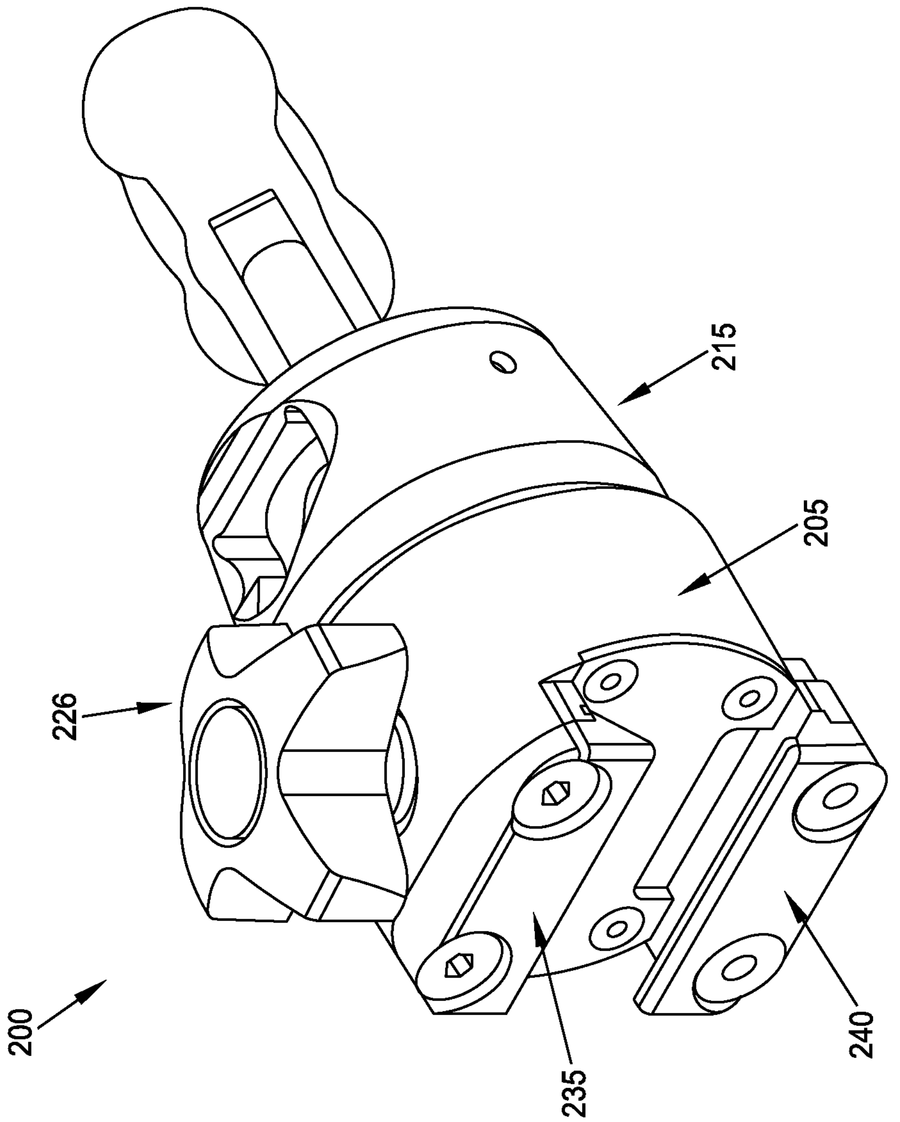
Figure 12:
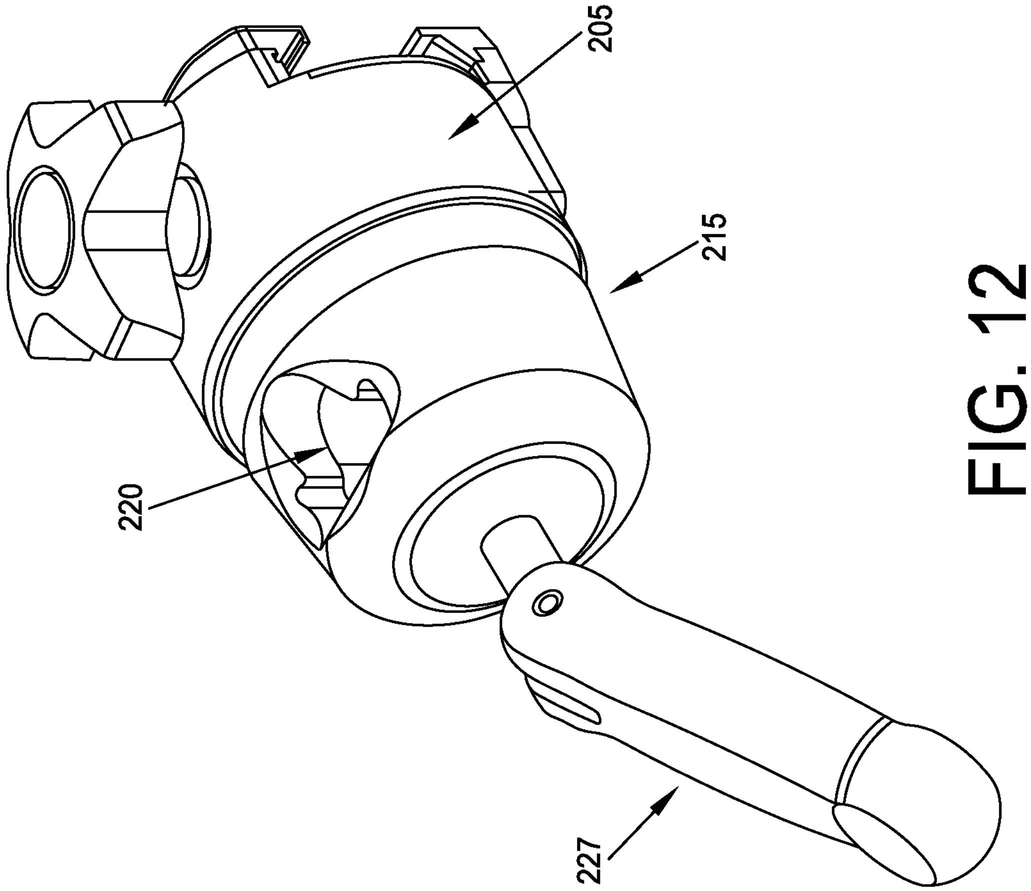
Figure 13:
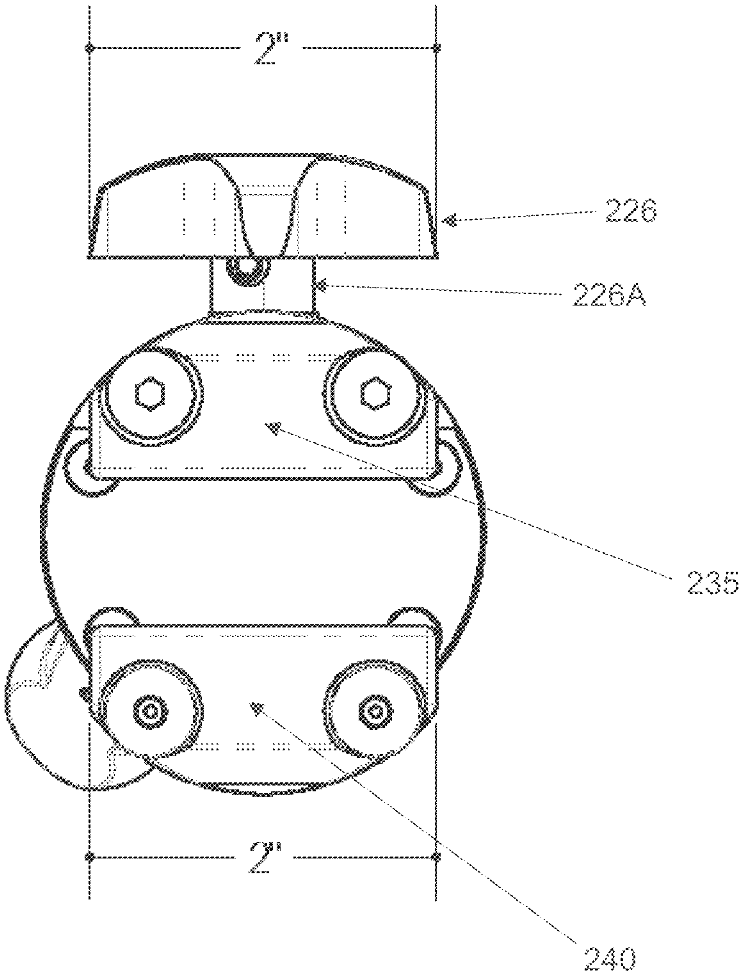
Figure 14:
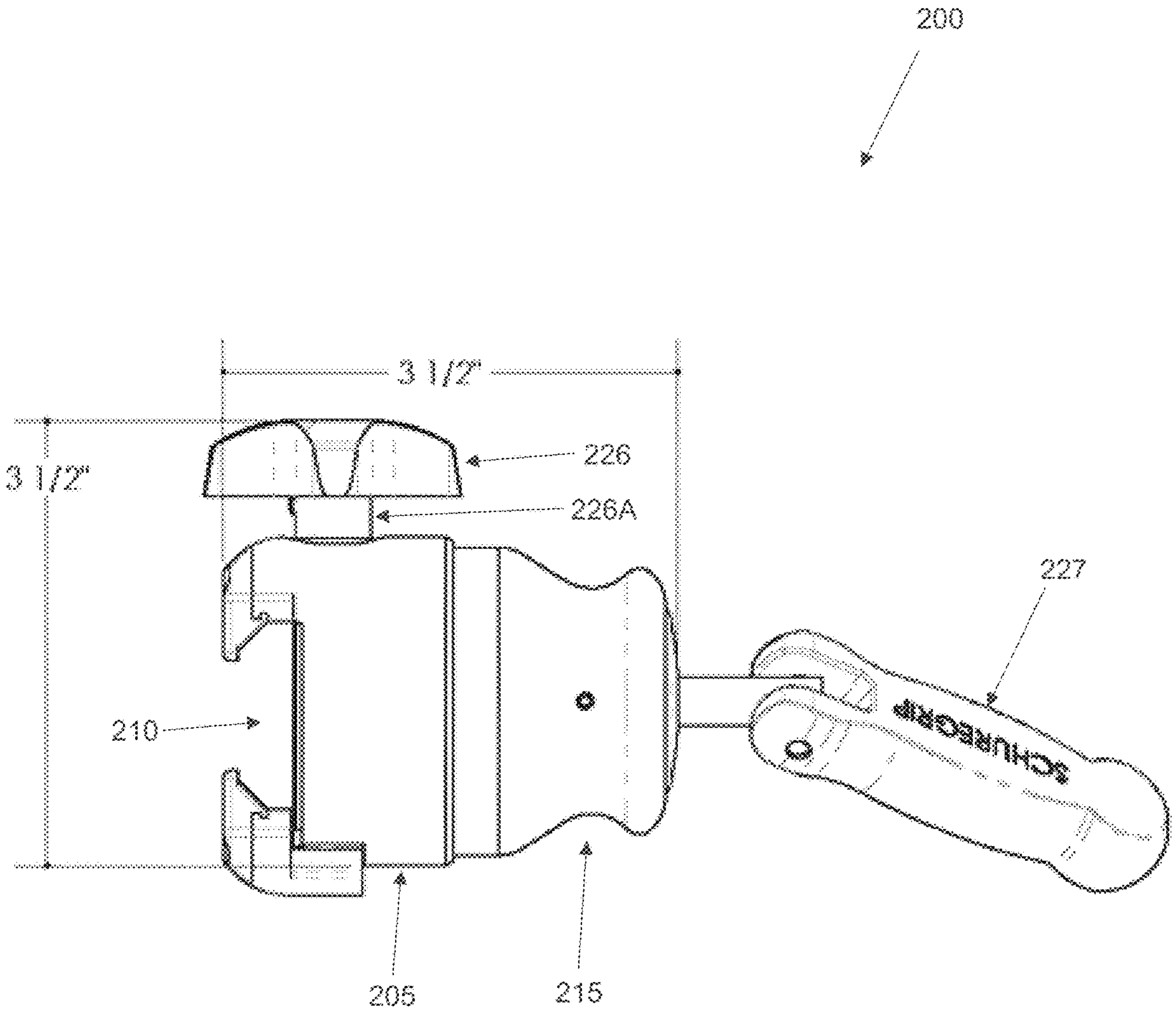
Figure 15:
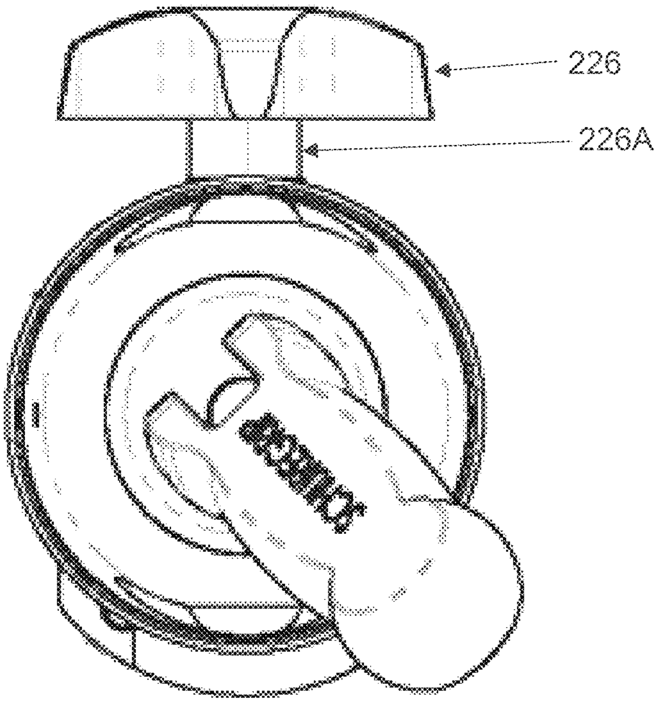
Figure 16:
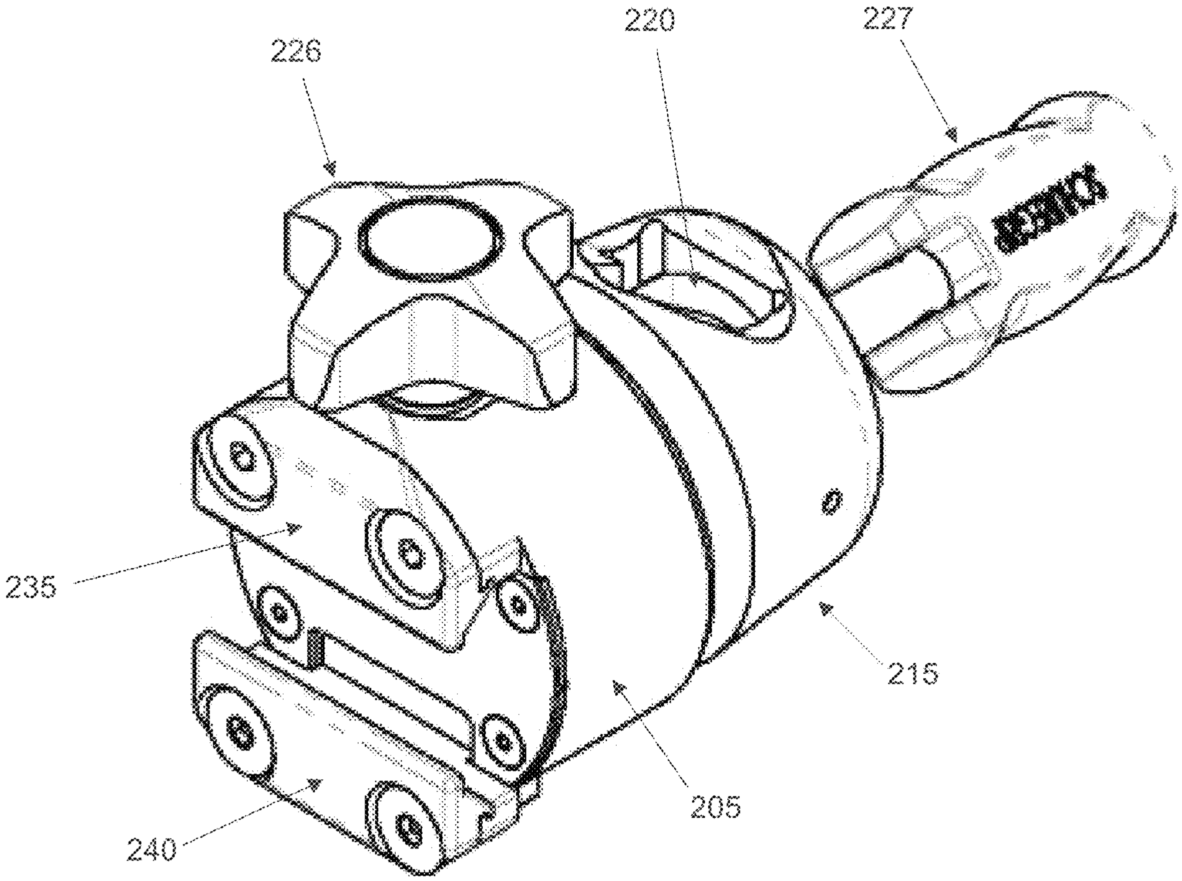
Figure 17:
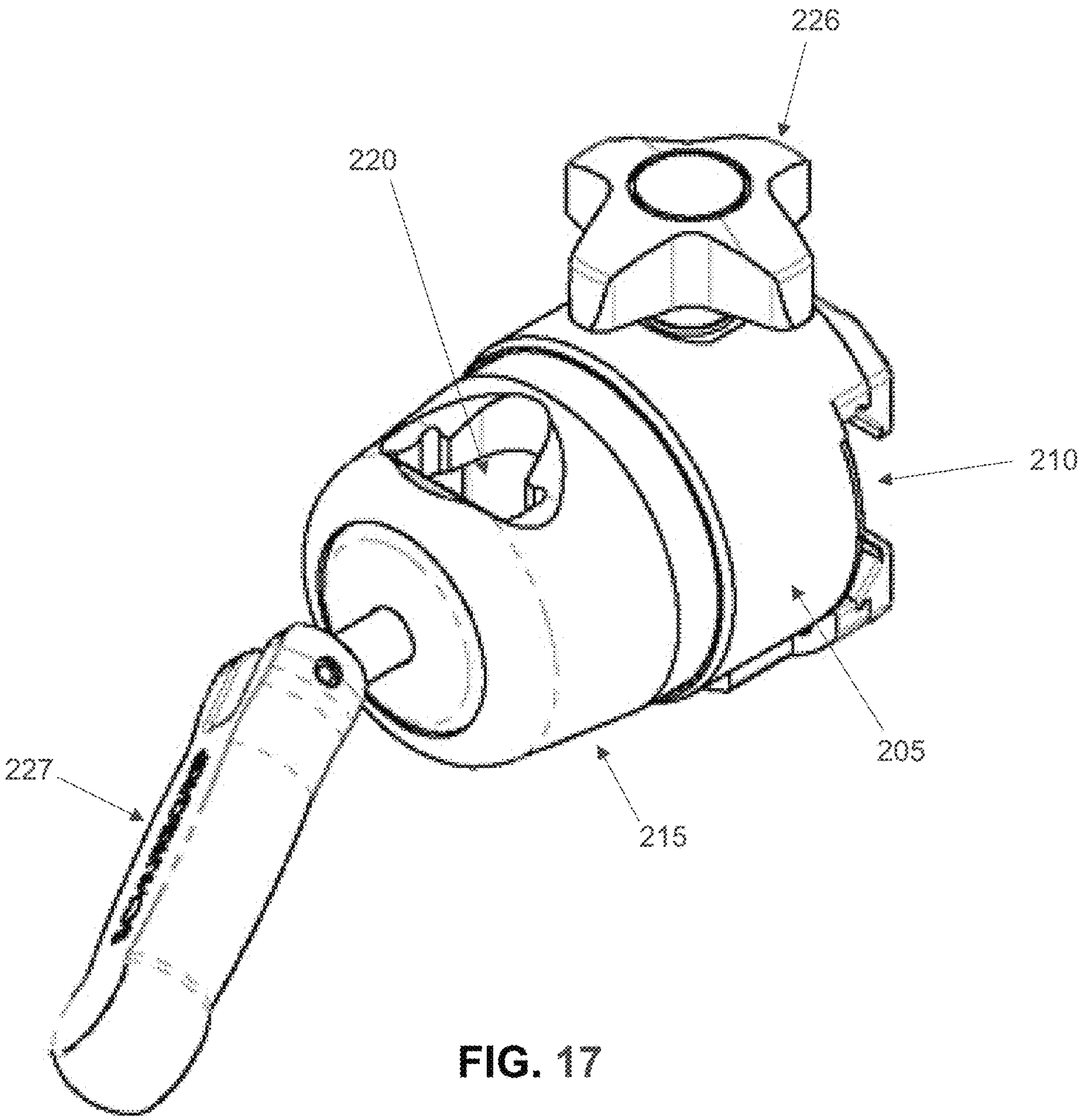

Looking now at FIGS. 7, 22 and 23, appliance mounting portion 215 preferably also comprises an appliance mounting portion body 315 disposed coaxially over bearing element 260 and preferably rotatably mounted to clamp body 205 via a clutch mechanism 250, as will hereinafter be discussed in further detail. Clutch mechanism 250 permits the rotational disposition of bearing element 260 (and hence, the rotational disposition of port 220 and the post of a medical appliance mounted within port 220) to be rotatably adjusted relative to clamp body 205.

Figure 22:
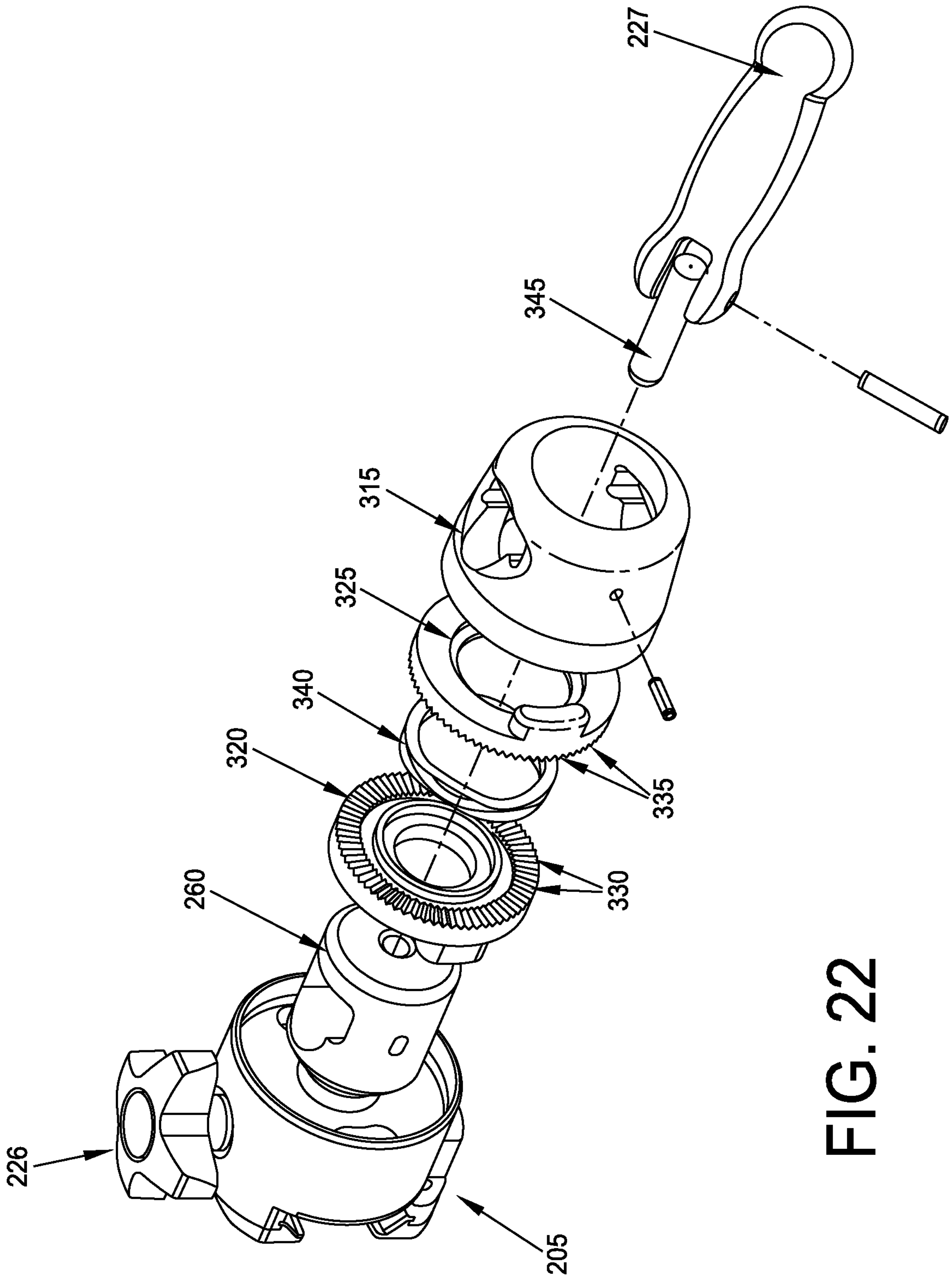
FIGS. 22 and 23 are schematic views showing further aspects of a novel clutch mechanism formed in accordance with the present invention.
Figure 23:
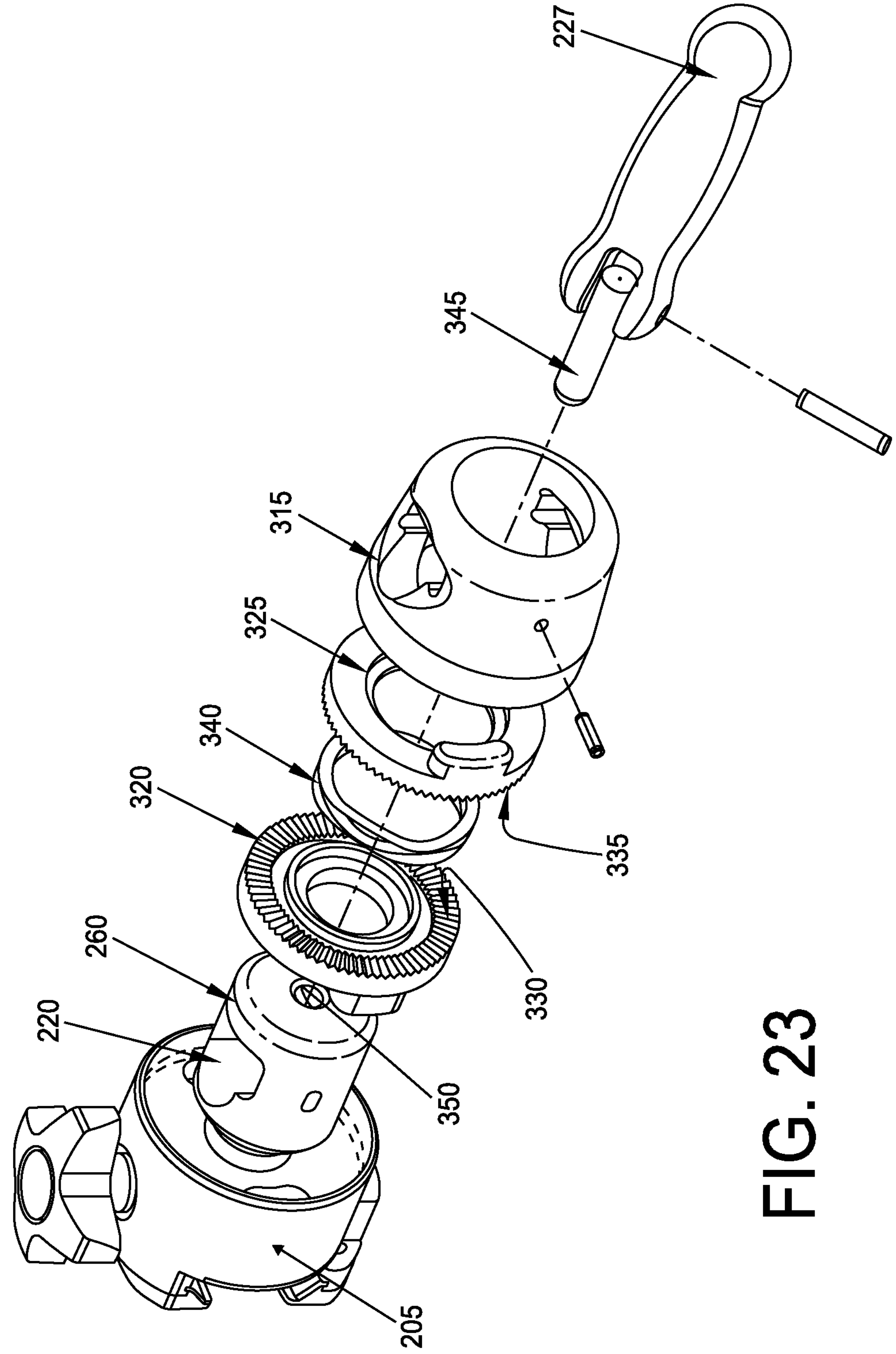

As can be seen in further detail in FIGS. 22 and 23, clutch mechanism 250 generally comprises a circumferentially-extending first plate 320 fixedly mounted to clamp body 205, and a counterpart circumferentially-extending second plate 325 fixedly mounted to appliance mounting body portion 315. First plate 320 comprises a plurality of teeth 330 formed on a surface facing second plate 325, and second plate 325 comprises a plurality of teeth 335 formed on a surface facing first plate 320. As a result of this construction, when teeth 335 of second plate 325 are mated to teeth 330 of first plate 320 (i.e., when teeth 335 are disposed between teeth 330 so as to mate therewith), second plate 325 is rotationally fixed relative to first plate 320. Thus, when teeth 330 of first plate 320 are mated to teeth 335 of second plate 325, appliance mounting body portion and bearing element 260 are rotationally fixed relative to clamp body 205. When teeth 335 of second plate 325 are disengaged from teeth 330 of first plate 320 (e.g., by moving appliance mounting portion 215 away from clamp body 205), appliance mounting portion 215 is able to rotate relative to clamp body 205.

In one preferred form of the invention, a spring 340 (FIG. 22) is provided intermediate first plate 320 and second plate 325, whereby to bias first plate 320 towards second plate 325 (i.e., such that teeth 330 of first plate 320 are biased into engagement with teeth 335 of second plate 325).

As a result of the foregoing construction, when a user desires to rotate appliance mounting portion 215 relative to clamp body 205, the user can pull appliance mounting portion 215 away from clamp body 205 (i.e., against the power of spring 340), rotate appliance mounting portion 215 as desired to dispose port 220 at the desired rotational disposition, and then release appliance mounting portion 215, with the result that spring 340 forces teeth 330 of first plate 320 and teeth 335 of second plate 325 into engagement, locking appliance mounting portion 215 at the set rotational disposition.

It will be appreciated that other means for rotationally locking and unlocking appliance mounting portion 215 relative to clamp body 205 will be apparent to those of skill in the art in view of the present disclosure.

As discussed above, appliance mounting portion 215 preferably further comprises the aforementioned handle 227 for securing a post (e.g., the post of a surgical instrument, a stirrup, etc.) within port 220 of appliance mounting portion 215. More particularly, handle 227 preferably comprises a threaded rod 345 configured to engage a threaded opening 350 in bearing element 260 so as to selectively project partly into port 220 passing through bearing element 260. As a result of this construction, when a post (not shown) of a medical appliance is disposed in port 220 of appliance mounting portion 215, handle 227 may be used to secure the post, and hence the medical appliance, to clamp 200 (and hence to a rail to which clamp 200 is mounted). More particularly, when handle 227 (and hence, threaded rod 345) is rotated in a first direction, threaded rod 345 is advanced into the interior of port 220 so as to bind a post disposed in port 220 within port 220, and when handle 227 (and hence, threaded rod 345) is rotated in a second, opposite direction, threaded rod 345 is retracted from the interior of port 220 so as to release a post disposed in port 220. In a preferred form of the invention, handle 227 is hingedly mounted to pin 287 (FIG. 21) such that handle 227 can be pivoted into a position against appliance mounting portion 215 when not being used, whereby to reduce the horizontal profile of clamp 200.

Thus, it will be appreciated that the present invention facilitates (i) mounting clamp 200 to surgical table rails with different height dimensions by selectively adjusting the distance between upper jaw 235 and lower jaw 240 so as to accommodate the particular rail to which clamp 200 is to be mounted, and/or (ii) selectively adjusting the rotational disposition of the post of a medical appliance (e.g., a surgical instrument, a stirrup, etc.) relative to a surgical table rail to which clamp 200 is mounted, and/or (iii) mounting an appliance (e.g., a surgical instrument, a stirrup, etc.) to clamp 200 (and thus a surgical table rail).

MODIFICATIONS

While the present invention has been described in terms of certain exemplary preferred embodiments, it will be readily understood and appreciated by those skilled in the art that it is not so limited, and that many additions, deletions and modifications may be made to the preferred embodiments discussed above while remaining within the scope of the present invention.

What is claimed is:

1. Apparatus for mounting a medical appliance to a rail of a surgical operating table, the apparatus comprising:

a clamp body having an appliance mounting portion and a rail mounting portion; and a clutch mechanism disposed between the rail mounting portion and the appliance mounting portion, wherein the clutch mechanism is configured to selectively assume (i) a locked condition in which the clutch mechanism prevents rotation of the appliance mounting portion relative to the rail mounting portion, and (ii) an unlocked condition in which the clutch mechanism permits rotation of the appliance mounting portion relative to the rail mounting portion;

wherein the rail mounting portion comprises an upper jaw and a lower jaw and a passageway disposed between the upper jaw and the lower jaw for receiving the rail of the surgical table, wherein the lower jaw is configured to be moved towards or away from the upper jaw.

2. Apparatus according to claim 1 wherein at least one of the upper jaw and the lower jaw comprise a slanted surface for engaging the rail to which the apparatus is mounted.

3. Apparatus according to claim 1 further comprising at least one spring for biasing the lower jaw away from the upper jaw.

4. Apparatus according to claim 1 further comprising a rod extending through the rail mounting portion for moving the lower jaw away from the upper jaw.

5. Apparatus according to claim 4 wherein the lower jaw comprises a threaded opening and the rod comprises a thread configured to mate with the threaded opening of the lower jaw, wherein (i) rotating the rod in a first direction effects movement of the lower jaw towards the upper jaw, and (ii) rotating the rod in a second, opposite direction, effects movement of the lower jaw away from the upper jaw.

6. Apparatus according to claim 5 wherein the rod comprises a knob for rotating the rod.

7. Apparatus according to claim 1 wherein the appliance mounting portion comprises an opening for receiving a medical appliance.

8. Apparatus according to claim 1 wherein the appliance mounting portion is rotatably mounted to the rail mounting portion.

9. Apparatus according to claim 8 wherein the appliance mounting portion comprises a bearing element, wherein the bearing element comprises:

a stationary bearing fixedly mounted to the rail mounting portion; and a rotatable bearing coaxially mounted over the stationary bearing and configured to rotate relative thereto.

10. Apparatus according to claim 9 wherein the rotatable bearing comprises a port configured to receive the medical appliance.

11. Apparatus according to claim 10 further comprising an appliance mounting body portion mounted to the rotatable bearing so as to be coaxially disposed relative thereto, wherein the appliance mounting body portion comprises an opening aligned with the port of the rotatable bearing, the opening being configured to receive the medical appliance.

12. Apparatus according to claim 11 wherein the rotatable bearing comprises a threaded opening disposed perpendicular to the longitudinal axis of the port, wherein the apparatus further comprises a threaded rod, and wherein the threaded rod is disposed in the threaded opening and configured to move relative thereto when selectively rotated such that the threaded rod may be selectively advanced into the port or retracted away from the port.

13. Apparatus according to claim 12 further comprising a handle mounted to the threaded rod.

14. Apparatus according to claim 1 wherein the clutch mechanism comprises:

a first plate fixedly mounted to the rail mounting portion, the first plate comprising a plurality of first plate teeth;

a second plate fixedly mounted to the appliance mounting portion, the second plate comprising a plurality of second plate teeth;

a spring disposed between the first plate and the second plate, the spring configured to draw the second plate towards the first plate;

wherein the first plate teeth are configured to mate with the second plate teeth when the first plate is in contact with the second plate, whereby to prevent rotation of the second plate relative to the first plate.

15. Apparatus according to claim 14 wherein the second plate may be selectively moved away from the first plate by applying a force against the power of the spring, whereby to permit rotation of the second plate relative to the first plate.

16. A method for mounting a medical appliance to a rail of a surgical operating table, the method comprising:

providing apparatus comprising:

a clamp body having an appliance mounting portion and a rail mounting portion; and a clutch mechanism disposed between the rail mounting portion and the appliance mounting portion, wherein the clutch mechanism is configured to selectively assume (i) a locked condition in which the clutch mechanism prevents rotation of the appliance mounting portion relative to the rail mounting portion, and (ii) an unlocked condition in which the clutch mechanism permits rotation of the appliance mounting portion relative to the rail mounting portion;

wherein the rail mounting portion comprises an upper jaw and a lower jaw and a passageway disposed between the upper jaw and the lower jaw for receiving the rail of the surgical table, wherein the lower jaw is configured to be moved towards or away from the upper jaw;

adjusting the size of the passageway by moving the lower jaw towards or away from the upper jaw; and positioning the rail mounting portion of the clamp body over the rail of the surgical table.

17. The method according to claim 16 wherein the method further comprises further adjusting the size of the passageway by moving the lower jaw towards the upper jaw to secure the upper jaw and the lower jaw around the rail of the surgical table.

18. The method according to claim 17 wherein the apparatus further comprises a rod extending through the rail mounting portion, and further wherein movement of the rod effects movement of the lower jaw relative to the upper jaw; and moving the rod so as to effect movement of the lower jaw relative to the upper jaw.

19. The method according to claim 18 wherein:

the lower jaw comprises a threaded opening and the rod comprises a thread configured to mate with the threaded opening of the lower jaw, wherein (i) rotating the rod in a first direction effects movement of the lower jaw towards the upper jaw, and (ii) rotating the rod in a second, opposite direction, effects movement of the lower jaw away from the upper jaw; and rotating the rod in the first direction or the second direction.

* * * * *